Aug. 12, 1947.       F. E. FROST ET AL       2,425,611
PLASTIC DOOR KNOB
Filed Nov. 17, 1944
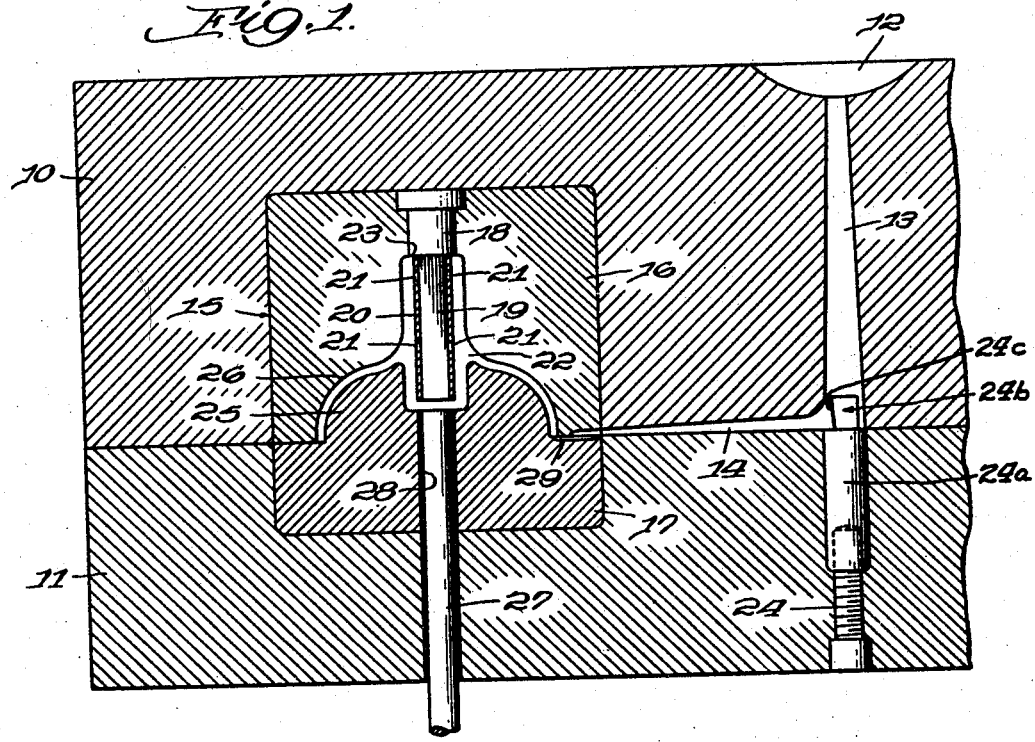
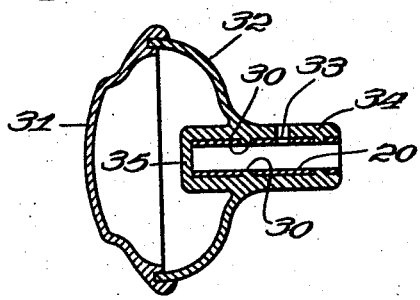
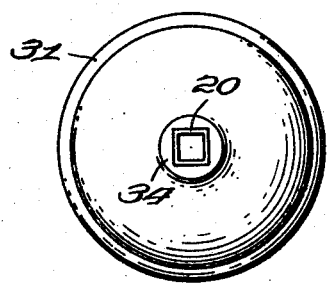
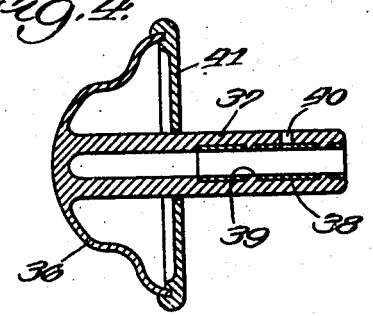
Inventors:
Frank E. Frost
Edward A. Pavlis.
By Kenneth T. Snow
Agent.

Patented Aug. 12, 1947

2,425,611

UNITED STATES PATENT OFFICE 2,425,611

PLASTIC DOOR KNOB

Frank E. Frost, Chicago, and Edward A. Pavlis, Berwyn, Ill.

Application November 17, 1944, Serial No. 563,843

3 Claims. (Cl. 292—347)

1

This invention relates to a new and improved plastics door knob and has for one of its principal objects the provision of means for fixedly anchoring a metal sleeve therewithin.

An important object of this invention is to provide a method of manufacturing a plastics door knob in which a perforated metal tubing is placed substantially centrally of a mold and plastic is formed therearound so that the sleeve is non-removable.

Another important object of this invention is the provision of a two part forming die, one part of which is equipped with a core adapted to telescope within a length of perforated metal tubing whereupon plastic or other moldable material applied under pressure to the die will enter the perforations, but will be prevented from passing into the interior of the tubing because of the position of the die core.

A further important object is the provision of means for a plastics molding die wherein a steel tube may be placed into the die preliminary to injecting a plastic under pressure.

Another and further object is to provide a novel means of removing a finished plastics knob from the molding dies.

The present plastics knob depicts the acme of simplicity, and yet its ingenious characteristics make it a highly useful and beneficial product. Heretofore door knobs have successfully been made of steel, brass and glass, but when attempts were made to use a plastic, the problem of making a socket for reception of a lock shaft proved insurmountable or so expensive as to be prohibitive. Others have attempted to provide a metal tubular socket within plastics knobs, but the methods used to get them to stay in were not at all feasible. First it was thought the sleeve would remain fixed in the knob merely by molding the plastic around the sleeve. However plastics shrink when setting, and the sleeve was invariably loose and the knob unsatisfactory. A second method was to turn up a flange at the inner end of the sleeve so that it could not pull out. This was successful, but the extra operation in flanging the tube or sleeve prevented competitive selling of the completed knob. Still others used specially prepared sleeves which were not standard tubing and the price was necessarily raised too high to sell the knobs. An object of the present

2 invention therefore is to use a standard tubing having only holes drilled therein for the purpose of receiving a set screw and to permit the plastic to run in other holes and form a permanent anchor for the tubing within the plastics knob.

Other and further objects will become apparent from the disclosures in the following specification and accompanying drawing in which:

Figure 1 is a sectional view through the door knob molding die of this invention;

Figure 2 is a sectional view of the completely formed door knob.

Figure 3 is an end view of the knob as shown in Figure 2; and

Figure 4 is a modified form of plastics door knob.

As shown in the drawings:

The reference numeral 10 indicates generally the fixed part of a die holder which is positioned above the complementary removable part 11 of the die holder. The die holder 10—11 as shown is capable of making several pieces of the finished molded product. A gate or pouring opening 12 is provided preferably centrally of the die holder and joins with a sprue chamber 13 which conducts a fluid plastics material to a plurality of channels 14 only one of which is shown. The channel 14 communicates with the die 15. This die 15 is made of relatively harder material capable of withstanding the pressures and abrasive actions of any plastics material that may be used. Several of these dies may be in one die holder.

The die consists of upper and lower sections 16 and 17 which correspond to the upper and lower parts 10 and 11 of the die holder. The upper section 16 which is fixed within the die holding part 10 is equipped with a unitary core member 18. A shank portion 19 of the core and preferably square or polygonal in cross section extends downwardly within the die and is adapted to telescopically engage a square tubular sleeve 20 which is subsequently to become the central part of a plastics knob.

The tubular sleeve 20 is cut from standard square tubing after which it has several holes 21 drilled in its side walls. The holes 21 in the sleeve 20 are open to the flow of plastics material through the knob mold space 22. An annular shoulder 23 is provided on the core 18 at the upper end of the square shank 19. The sleeve 20 is cut so that it is just long enough to be fully coextensive with the square shank 19. The sleeve is slipped over the core shank with a rather snug fit until it abuts the annular shoulder 23. At this point the lower half 17 of the die 15 is brought into position beneath the die part 16.

A bolt 24 in the die holder 11 threadedly engages a sleeve 24a which has an upward projection 24b extending within the sprue chamber 13. The projection 24b has an undercut face 24c which insures removal of the molded plastics material with the lower die part 11. A convex upwardly extending portion 25 of each lower die member 17 aids in the proper centering of the die parts as they must project upwardly within opposed concave recesses 26 within the upper parts of the dies 16. An ejector pin 27 is adapted to extend through a hole 28 in the lower die part 17 and has a tight fit to prevent escape of injected plastics therepast.

A plastics material preferably of the thermoplastic type is injected under pressure through the gate 12, down the sprue chamber 13, around the projection 24b and thence around the channels 14 to the dies 15. The channel 14 communicates with the knob mold space 22 at 29 within the die 15 and permits the plastics material to fill the mold space as well as apertures 21 in the sleeve. The plastics material is prohibited from entering the interior of the sleeve 20 because the core shank 19 completely fills the interior space both at the point of the apertures 21 and at the end of the sleeve.

The plastics knobs are then permitted to set, after which the lower section 17 of the die and the lower holder part 11 is removed. The newly cast knobs and the sprue common to each will come with the removable section by reason of the undercut face 24c exerting a force on the plastic sprue. This force is capable of being overcome by an upward sliding of the ejector pin 27 after the lower die holder 11 and the molded plastics have been removed from the upper die holder 10. This one undercut face 24c is capable of removing the single centrally located sprue and also is sufficiently weak in its hold to be releasable by the upward sliding of the ejector pin 27. The finished section of the knob has the metal tubular sleeve 20 for a base and is positively anchored within the plastics knob, although the square opening in the knob for a square lock shaft is perfectly clean and free of surplus plastics. This feature of locking the sleeve by plastics projections 30 within apertures in the insert sleeve is quite advantageous and doubly so because it leaves the lock shaft opening clear to receive the lock shaft without any cleaning operation.

Figure 2 shows a completed knob in which a cap or crown portion 31 is cemented, snapped or otherwise fastened to the base portion 32 of the knob which is made as shown in Figure 1. After completion, a hole 33 is drilled through the cylindrical portion 34 of the knob so that a small screw may be inserted to engage a lock shaft. Use of this plastics knob causes strains on the metal insert and its bond with the plastics, however, the plastics projections 30 are capable of withstanding any load that may be applied to the knob without breaking the plastics material free of the metal insert.

If the plastics material is transparent or even translucent the metallic or steel sleeve will not mar the appearance because the inner end of the sleeve is covered with plastic as shown at 35. This necessitates vision through two thicknesses of the plastics material and the sleeve is quite diffused. The knob may be made of a solid plastics material in lieu of the shell like knob illustrated. Further the anchoring of a metal sleeve 20 within a knob need not be confined to plastics knobs, but may be equally well used with other metals where it is desirous of having a particular sleeve material and a different outer material.

Figure 4 shows a modified form of knob in which the cap or crown 36 is integral with the cylindrical portion 37 within which is molded a metal sleeve 38. This sleeve 38 is locked in position by means of plastics projections 39 within apertures in the sleeve 38. A screw holding aperture 40 corresponds with the aperture 33 in the knob shown in Figure 2. A plastics back plate 41 is cemented to the rear face of the crown 36 and completes the enclosed plastics knob.

Numerous details of construction may be varied throughout a wide range without departing from the principles disclosed herein and we do not propose limiting the patent granted hereon otherwise than as necessitated by the appended claims.

We claim:

1. A door knob including complementary inner and outer shell parts of plastics material, the inner of said shell parts having an integral sleeve-like shank having a portion extending inwardly of said knob and an aligned portion extending outwardly from said knob, said sleeve-like shank being wholly supported by the inner shell part, a metallic sleeve having apertures in its side walls, said metallic sleeve positioned wholly within said sleeve-like plastics shank and adapted to receive a lock shaft, and said plastics shank having inwardly extending projections in alignment with the apertures in the metallic sleeve side walls, said projections extending flush to the inner surface of the sleeve and locking said metallic sleeve in fixed relationship with the plastics shell shank.

2. A door knob including complementary inner and outer shell parts of plastics material, the inner of said shell parts having an integral sleeve shank having a portion projecting inwardly of said door knob and closed at its inner end and a portion extending outwardly from said door knob and open at its outer end and in axial alignment with the portion projecting inwardly, said sleeve shank being wholly supported by the inner shell part, a metallic sleeve equal in length to the combined length of the sleeve shank portions and having apertures in its walls, said metallic sleeve positioned wholly within said plastics sleeve shank and abutting the closed inner end of the plastics sleeve shank portion projecting inwardly of said door knob and adapted to receive a lock shaft, and said plastics sleeve shank having inwardly extending projections in alignment with the apertures in the metallic sleeve walls, said projections extending flush to the inner surface of the sleeve and locking said metallic sleeve in fixed relationship with the plastics shell shank, whereby the closed inner end of said sleeve shank provides a fixed stop for a lock shaft.

3. A door knob including complementary inner and outer shell parts of plastics material, the inner of said shell parts having an integral sleeve shank having a portion projecting inwardly of said door knob and closed at its inner end and a portion extending outwardly from said door knob and open at its outer end and in axial alignment with the portion projecting inwardly, said sleeve shank being wholly supported by the inner shell part, a metallic sleeve having apertures in its side walls positioned wholly within said plastics sleeve shank and adapted to receive a lock shaft, and said plastics sleeve shank having inwardly extending projections in alignment with the apertures in the metallic sleeve walls, said projections extending flush to the inner surface of the sleeve and locking said metallic sleeve in fixed relationship with the plastics shell shank, whereby the closed inner end of said sleeve shank provides a fixed stop for a lock shaft.

FRANK E. FROST.
EDWARD A. PAVLIS.

REFERENCES CITED

The following references are of record in the file of this patent:

UNITED STATES PATENTS

| Number | Name | Date |
|---|---|---|
| 672,866 | Tyson | Apr. 23, 1901 |
| 1,986,374 | Shippy | Jan. 1, 1935 |
| 2,304,036 | Tegarty | Dec. 1, 1942 |
| 2,356,585 | Hempel | Aug. 22, 1944 |
| 839,258 | Benecke | Dec. 25, 1906 |
| 1,568,883 | Danielson | Jan. 5, 1926 |
| 1,746,059 | Swanson | Feb. 4, 1930 |
| 1,767,421 | Wirth | June 24, 1930 |
| 1,829,371 | Ross | Oct. 27, 1931 |
| 1,919,455 | Wilson | July 25, 1933 |
| 2,199,018 | Bahr | Apr. 30, 1940 |
| 2,293,630 | Ruppel | Aug. 18, 1942 |
| 1,687,531 | Verse | Oct. 16, 1928 |
| 1,996,357 | Voight | Apr. 2, 1935 |
| 2,125,783 | Heeman | Aug. 2, 1938 |
| 2,273,190 | Harrison | Feb. 17, 1942 |